July 20, 1965

L. J. ELLIOTT ETAL 3,196,337

ELECTRICAL INVERTER SYSTEM

Filed Oct. 19, 1959

INVENTORS
LOUIS J. ELLIOTT
THOMAS C. WARD
BY FULWIDER, MATTINGLY
& HUNTLEY

ATTORNEYS

INVENTORS
LOUIS J. ELLIOTT
THOMAS C. WARD

BY FULWIDER, MATTINGLY & HUNTLEY
ATTORNEYS

3,196,337
ELECTRICAL INVERTER SYSTEM
Louis J. Elliott and Thomas C. Ward, Encinitas, Calif., assignors to Kinetics Corporation, Encinitas, Calif., a corporation of California
Filed Oct. 19, 1959, Ser. No. 847,124
4 Claims. (Cl. 321—45)

The present invention relates to electrical inverter systems, and more particularly to such systems which employ passive electrical elements to provide alternating-current electrical energy from a direct-current source of electrical energy.

Electrical inverter systems are widely employed in conjunction with various electrical equipment to convert direct-current electrical energy into alternating-current electrical energy. An exemplary use of an electrical inverter system is in the provision of 400 cycle alternating-current energy in the electrical systems of various aircraft and missiles. Aircraft units of this type sometimes employ batteries as a source of electrical energy; therefore, an inverter system is required to convert the direct-current electrical energy from the battery into an alternating-current form for use by various components.

Various types of electrical inverters have been proposed in the past; however, in general, previous inverters have had certain limitations or undesirable characteristics. For example, one common class of inverters employ rotating machinery and are generally somewhat bulky and heavy. Furthermore, rotary-type inverters also have the disadvantages generally attendant systems incorporating moving parts.

Various types of inverters have also been proposed, which employ vacuum tubes to perform the necessary switching operation in the energy conversion. However, vacuum tubes often fail when subjected to the extreme environmental conditions encountered in various aircraft, and are generally limited in durability.

Electrical inverters have also been constructed using transistors as a switching means; however, previous systems of this type have generally required complex circuits, and furthermore, the power which may be provided is normally limited to the power capabilities of the transistors.

In addition to the difficulties considered above, generally attendant previous electrical inverter systems, further difficulty has often been encountered in attempting to control the amplitude of the output from the inverter system. In general, previous regulators for maintaining the voltage output of inverter systems substantially constant, have been somewhat inefficient and expensive.

In general, the present invention comprises an electrical inverter system wherein a transformer is provided with two input windings and at least one output winding. A pair of switching means is then individually connected to the two input windings and adapted to be connected to provide electrical currents through the windings with different polarities whereby to differently energize the output winding. A control circuit alternately closes the switching devices and the circuits containing the switching devices are intercoupled, as inductively, so that upon closure of one of the switching devices, the other device is opened. The two circuits containing the switching devices may be connected to have a common portion which contains a variable impedance for regulating the output of the system. One form of the variable impedance may comprise an oscillatory circuit.

An object of the present invention is to provide an improved electrical inverter system.

Another object of the present invention is to provide an electrical inverter system having a regulated output which may be economically constructed and which is durable and rugged.

Still another object of the present invention is to provide an economical inverter system for converting direct-current energy into alternating-current energy which system may be economically constructed.

A further object of the present invention is to provide an electrical inverter system which may be economically constructed of solid-state electrical components.

Still a further object of the present invention is to provide an electrical inverter system incorporating a regulator means comprising a variable impedance for efficiently regulating the output of the system.

Other and incidental objects and advantages of the present invention will become apparent from a consideration of the following specification and the accompanying drawings in which:

FIGURE 4 is a diagrammatic representation of still a further embodiment of the present invention.

Figure 1:
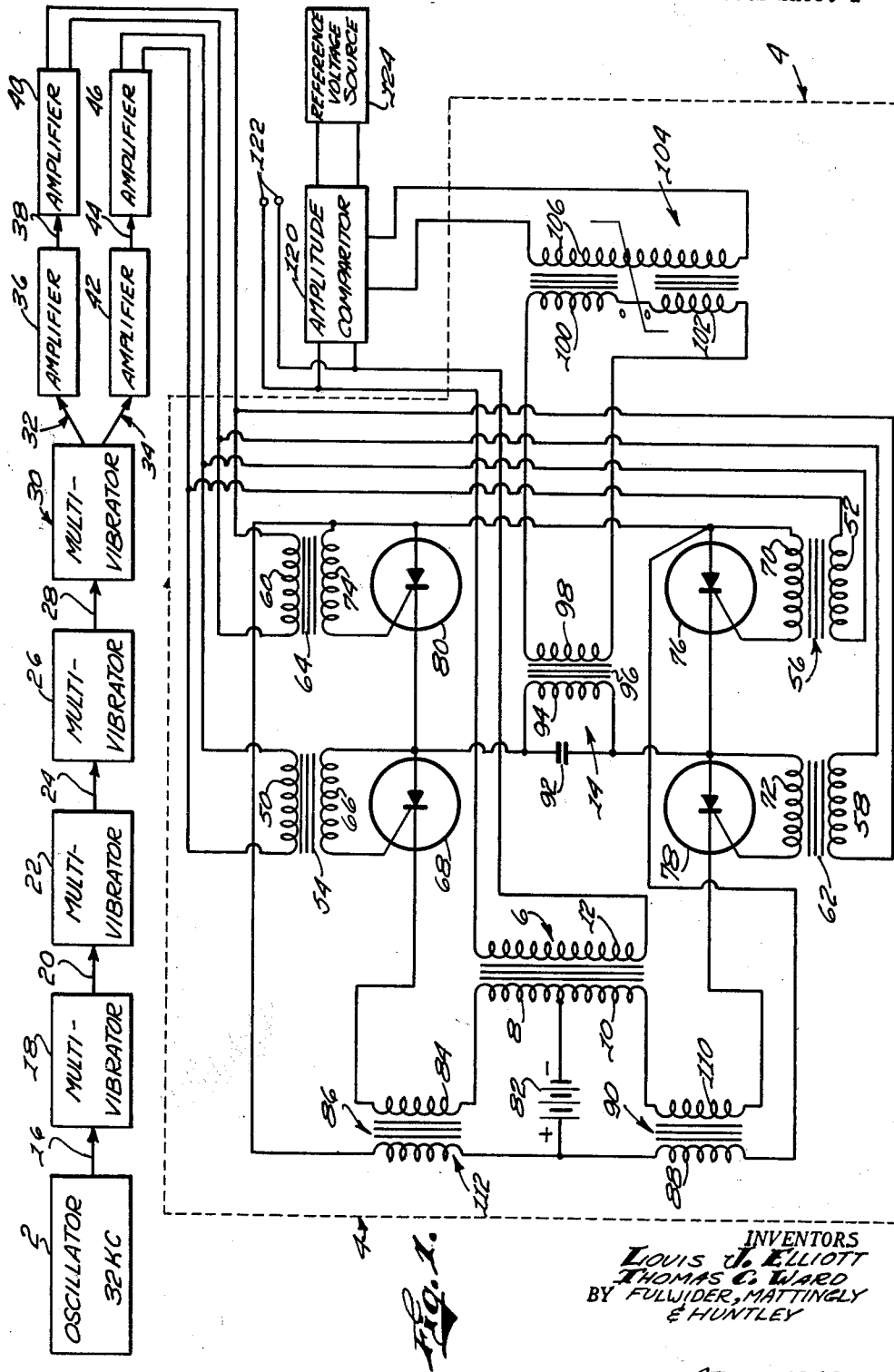
FIGURE 1 is a diagrammatic representation of one embodiment of an electrical inverter constructed in accordance with the present invention.

Referring now to the drawing, there is shown an oscillator 2 for providing a stable sinusoidal electrical signal. The oscillator 2 may operate at a relatively-high frequency, so as to employ a crystal to provide an extremely stable signal. The signal from the oscillator 2 is passed through a number of circuits (considered hereinafter) to develop a control signal which is applied to an inverter circuit 4. The inverter circuit 4 incorporates a transformer 6 having input windings 8 and 10 and an output winding 12. According to the operation of the system, current is alternately passed through the input windings 8 and 10 (which may comprise a single center-tapped winding) to induce an alternating-current voltage in the output winding 12. The currents flowing through the windings 8 and 10 also flow through an oscillatory circuit 14 which is variable and therefore presents a variable impedance to the currents whereby to regulate the amplitude of the voltage induced in the output winding 12.

Considering the system of FIGURE 1 in greater detail, the oscillator 2 may comprise a crystal-controlled oscillator which operates at a stable frequency, say for example 32 kilocycles per second. The output from the oscillator 2 is coupled through a conductor 16 to a bistable multivibrator 18. The multivibrator 18 may comprise various two-state circuits, well known in the prior art, and functions to provide an output signal to conductor 20 which has a repetition rate of one-half the repetition rate of the input to the multivibrator 18. The output to the conductor 20 may comprise relatively short-duration pulses.

The conductor 20 is connected to the input of a bistable multivibrator 22 which is in turn connected through a conductor 24 to a similar multivibrator 26, that is connected through a conductor 28 to another similar multivibrator 30.

The multivibrators 18, 22, 26 and 30 may be similarly constructed, each functioning to reduce the repetition rate of a received signal by a factor of two. In this manner, a very stable signal is provided from the multivibrator 30 which is employed as a control signal for the inverter circuit 4. Actually, two signals are provided from the multivibrator 30 in the conductors 32 and 34 which signals comprise regularly-spaced pulses. The pulses appearing in the conductor 32 are offset with respect to the pulses in the line 34 so that the pulses in the line 32 occur substantially at the midpoint of time between the pulses in the conductor 34.

The conductor 32 is connected to the input of an amplifier 36 which is in turn connected through a conductor 38 to an amplifier 40. Similarly, the conductor 34 is connected to an amplifier 42 which is in turn connected by a conductor 44 to an amplifier 46.

The output of the amplifier 46 is applied to the parallel-connected windings 50 and 52, of transformers 54 and 56, respectively. Similarly, the amplifier 40 is connected to windings 58 and 60 of transformers 62 and 64, respectively. The transformers 54, 56, 62 and 64 may comprise pulse transformers for receiving pulses from the amplifiers 40 and 46 and coupling these pulses to three element controlled diodes or control rectifiers in the inverters circuit 4.

A second winding 66 of the transformer 54 is connected across a controlled rectifier 68 from the control electrode to the cathode electrode. Similar second windings 70, 72 and 74 of transformers 56, 62 and 64, respectively, are connected across controlled rectifiers 76, 78 and 80, respectively. The controlled rectifiers 68, 76, 78 and 80 may comprise semiconductor devices having electrical characteristics somewhat similar to grid-controlled gas-discharge devices, as thyratrons. That is, the controlled rectifiers are capable of withstanding considerable voltage in a forward direction without going into conduction until a pulse is applied to the control electrode. However, after the termination of the pulse, the rectifiers continue to conduct until the voltage across the device is reduced essentially to zero. These devices are commercially available from the General Electric Company and are identified as by the designation ZA–39A.

The controlled rectifiers in the inverter circuit are connected in circuits to control the current flowing through windings 8 and 10 of the transformer 6. Specifically, the transformer winding 8 is connected in series with a battery 82, winding 84 of a coupling transformer 86, the controlled rectifier 68, the oscillatory circuit 14, the controlled rectifier 76, and winding 88 of a coupling transformer 90.

The oscillatory circuit 14 includes a condenser 92 and a winding 94 of a transformer 96. The other winding 98 of the transformer 96 is serially connected with oppositely-wound windings 100 and 102 of a variable inductance or magnetic amplifier 104. The windings 100 and 102 in the magnetic amplifier 104 are opposed to prevent feedback from the windings to a control winding 106. The control winding 106 is connected to receive a current indicative of the amplitude of the inverter output as will be described in detail hereinafter.

Returning now to a consideration of the current-flow in the windings of the transformer 6, the winding 10 is serially connected with a winding 110 of the transformer 90, the control rectifier 78, the oscillatory circuit 14, the control rectifier 80, a winding 112 of the transformer 86 and the battery 82.

A consideration of the above-described circuit paths indicates that each of the circuits through the windings 8 and 10 contain two serially-connected switching devices. This plurality of serially-connected switching devices is provided in order to accommodate the voltage of the battery 82. That is, in accordance with the present invention, a plurality of the controlled rectifiers, i.e., switching devices, may be serially-connected to adequately handle the voltage magnitude of the battery 82. However, it will be evident that a single switching device could be employed in the event such a device is available for the selected voltage of the battery 82.

It is also to be noted that the circuits through the windings 8 and 10 have a common portion, i.e., that portion of the circuit containing the oscillatory circuit 14. Therefore, the impedance presented by the oscillatory circuit 14 (which is variable) is presented to current flowing in both the windings 8 and 10 and thereby controls the current and in turn the amplitude of the voltage induced in the winding 12 both during positive and negative excursions.

The impedance presented by the oscillatory circuit is dependent upon the inductance presented by the windings 94. That is, when the inductive reactance of the windings 94 is equal to the capacitive reactance of the condenser 92, the impedance of the circuit 14 is at a maximum. However, as the inductance of the winding 94 changes, the state of the oscillatory circuit 14 gradually departs from resonance with a resultant decrease of impedance. Normally, the values of the elements in the oscillatory circuit 14 are such that this circuit is operated on a linear portion of the impedance-inductance curve.

The inductance of the winding 94 is effectively the inductance of the variable inductance or magnetic amplifier 104 which is reflected into the oscillatory circuit through the transformer 96. The inductance of the magnetic amplifier 104 is controlled by the current flowing in the winding 106 thereof which is connected to an amplitude comparator 120. The amplitude comparator is connected to receive the output voltage induced in the winding 12, which voltage is also coupled to output terminals 122. The amplitude comparator 120 also receives a voltage from a reference voltage source 124.

Amplitude comparators, as the comparator 120, are well known in the prior art and function to provide a signal indicative of the difference between two voltages. The signal so provided by the comparator 120 is applied to the winding 106 of the magnetic amplifier 104. Therefore, the variation in the voltage appearing across the output terminals 22 from a desired voltage as indicated by the reference voltage source 124, is manifest as a variation in inductance by the magnetic amplifier 104, which inductance is reflected into the oscillatory circuit 14 through the transformer 96. As a result, the effective impedance of the oscillatory circuit 14 varies as the variation in amplitude by the output voltage from a desired value. Of course, as the impedance of the oscillatory circuit increases, the current through the windings 8 and 10 is reduced with an attendant decrease in the amplitude of the voltage induced in the winding 12.

Considering the operation of the system of FIGURE 1, the oscillator 2 runs at a constant rate to provide a sinusoidal signal which is converted to pulses and decreased in rate by the multivibrators 18, 22 and 26 and then divided into two phase-shifted signals that are applied to amplifiers for amplification into control signals for the inverter circuit 4. The occurrence of a pulse from the amplifier 46 is transferred through the transformers 54 and 56 to the control rectifiers 68 and 76, respectively. Upon receiving a pulse on the control electrodes thereof, the controlled rectifiers 68 and 76 become conductive permitting current to flow through the winding 8 of the transformer 6. This current gradualy increases in magnitude and induces a voltage in the output winding 12 which appears across the output terminals 122. As the current through the winding 8 passes its peak and starts to decrease, the pulse from the amplifier 40 is applied through transformers 64 and 62 to the control electrodes of the controlled rectifiers 80 and 78. Therefore, these controlled rectifiers, e.g. switches, are closed permitting current to flow through the winding 10 of the transformer 6. The current through the winding 10 also passes through the winding 112 of the transformer 86 and induces a voltage in the winding 84 which is opposed to the voltage of the battery 82. The voltage so induced in the winding 84 reduces the voltage across the controlled rectifiers 68 and 76 to essentially zero whereby to cut off these controlled rectifiers. With the controlled rectifiers 68 and 76 cut off, current through the winding 8 is halted and a current through the winding 10 increases to induce the next half cycle of alternating voltage in the winding 12. After completion of the half cycle of voltage so induced, the controlled rectifiers 68 and 76 are again closed permitting current to flow through the winding 8 along with the winding 88 which results in a voltage induced in the winding 110 to open the controlled rectifiers 78 and 80.

In this manner, the system operates to provide an alternating voltage, induced in the winding 12, which appears at the output terminals 122. Of course, the frequency of the voltage is controlled by the pulse rate of pulses from the amplifiers 40 and 46, each pulse providing a half cycle of the output voltage.

The amplitude of the output voltage is regulated to coincide to the amplitude of the voltage source 124 by regulating the current in the windings 8 and 10. This regulation is effected by controlling the effective impedance of the oscillatory circuit 14 which is operated upon a linear portion of the resonance curve, as explained above.

Figure 2:
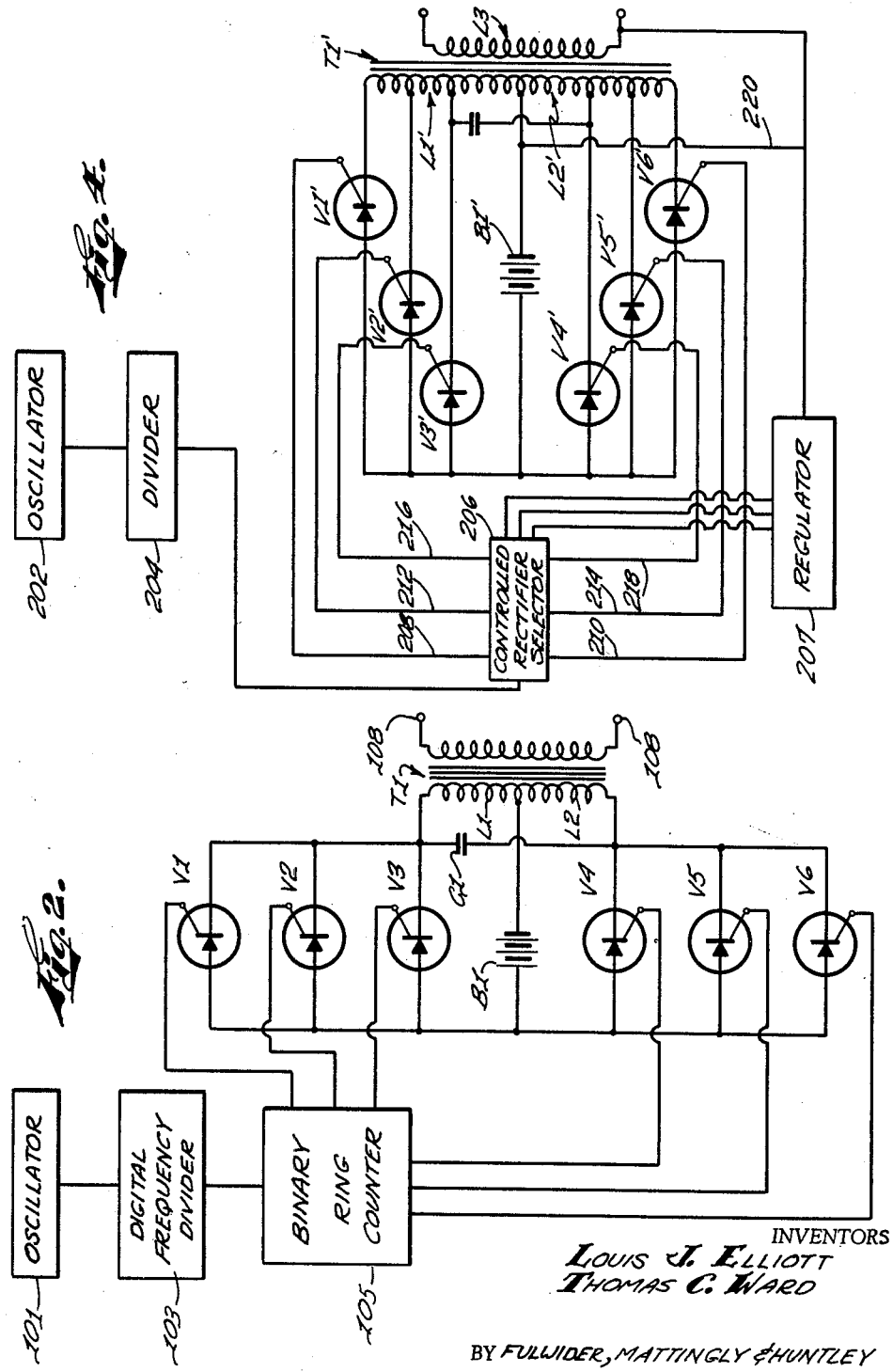
FIGURE 2 is a diagrammatic representation of another embodiment of the present invention.

Reference will now be had to FIGURE 2, which shows a variation of the basic inverter circuit as shown in FIGURE 1.

The oscillator 101, which may comprise a crystal or tuning fork-controlled circuit, operates at a sufficiently high frequency to insure good stabilization. The output of the oscillator is applied to a divider 103 or series of flip-flop circuits to reduce the frequency to a usable value. Specifically, for a single phase, 400 cps unit, the frequency of the voltage from the divider 103 is 400 c.p.s. That is, pulses emerge from the divider 103 at a rate of 400 per second. These pulses operate a binary ring counter 105 which is in turn connected to the controlled rectifiers, V1 through V6. The rectifiers are each connected to stages of the ring counter so that rectifier V1 is closed during the first half cycle, rectifier V4 is closed durning the next half cycle, then rectifier V2 during the next half, rectifier V5 the next, rectifier V3 the next, and rectifier V6 the next. The following half cycle, V1 closes again and the sequence is repeated.

In this manner, during each sequence of three full cycles, each of the controlled rectifiers is closed for one-half cycle and is operative in a 400 cycle unit for 1.25 milliseconds. Of course, the number of controlled rectifiers can veary to any reasonable figure merely by changing the number of positions on the ring counter. As a result, the greater the number of controlled rectifiers, the shorter the period of time will any one of them be conducting and the longer the period of time it will be off. In this manner, large amounts of current can be handled as a result of short intervals of condition. That is, the amount of current that can safely be passed through a controlled rectifier having a short duty cycle is many times greater than that which it can handle contniuously. For example, the General Electric C35A is rated at 16 amps continuous but at 150 amps, intermittent operation. Therefore, judicious choice of the type and quantity of controlled rectifiers will permit very high power levels to be reached.

Considering the operation of the circuit of FIGURE 2, assume that rectifier V1 has just closed. Current (plus to minus) flows from the positive terminal of a battery B1 through the controlled rectifier V1 and a winding L1 (on an output transformer T1) then back to the negative terminal of the battery B1. This flow of current induces a negative voltage at the lower end of the winding L2 and the capacitor C1 is thus charged so that its upper plate is positive and its lower plate negative.

Next, after 1.25 milliseconds in the illustrative embodiment, a signal is applied from the ring counter 105 to render the rectifier V4 conductive. With the rectifier V4 in a conductive state the capacitor C1 is connected directly across the controlled rectifier V1. As the bottom plate of C1 is negative, the polarity is such that a blocking voltage is applied to rectifier V1 and the current thorugh it is cut off. Thus, considering rectifier V1 as a switch, it "opens."

With rectifier V4 closed and rectifier V1 open, current flows from the battery B1 through rectifier V4, winding L2, and back to the battery. The charge developed on capacitor C1 is now reversed from the prior charge in polarity so that its lower plate is positive and the upper plate is negative.

Thereafter, when the rectifier V2 closes at the end of the half of the first cycle, the charge on capacitor C1 appears across rectifier V4 and blocks (opens) the conduction through rectifier V4.

It may therebore be seen that the system operates repeating the above-described pattern to alter the conduction through the windings L1 and L2, to thereby produce an alternating-current voltage in output winding L3 which appears in usable form across terminals 108.

Figure 3:
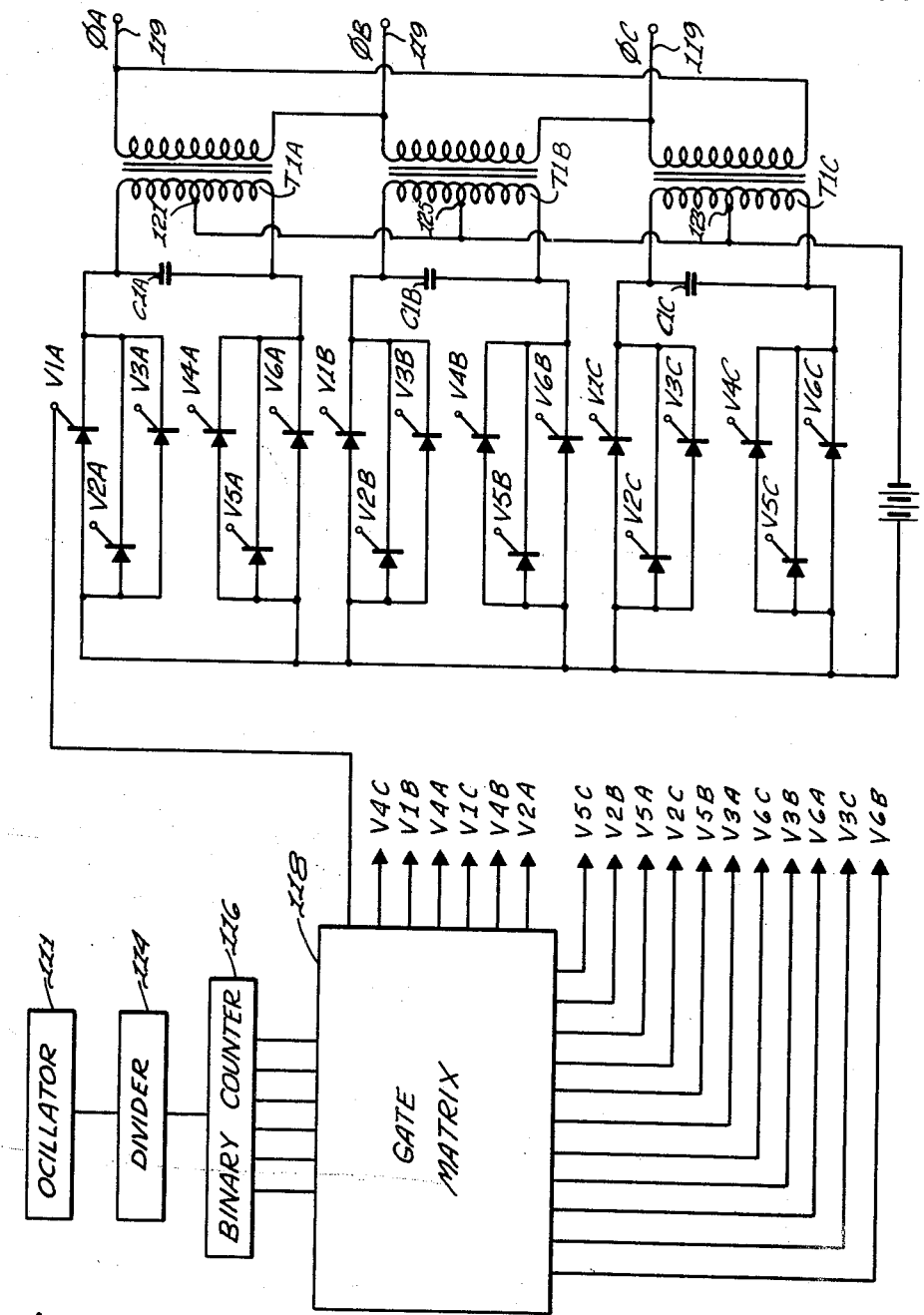
FIGURE 3 is a diagrammatic representation of still another embodiment of the present invention.

The circuit of FIGURE 2 can be embodied in a multiphase system as will now be considered with reference to FIGURE 3. It is to be noted that the basic operation of this three-phase system is similar to that described above.

Six controlled rectifiers (V1–V6) are shown for each phase and identified to be associated with different phases by letters A, B and C. In the event that the number of controlled rectifiers is large (as is very often the case with a three phase unit) the use of a diode gating matrix (as is well known in the art) may be used in conjunction with a binary ring. Specifically, an oscillator 111 is connected through a divider 114 which is in turn connected to a binary counter 116. The stages of the binary counter are connected to a gate matrix 118 having an output line for each of the controlled rectifiers. These lines each exclusively receive pulses in sequence. The lines V1–V6 for each of the controlled rectifiers are individually connected so that the rectifiers are rendered conductive with the desired phase displacement to energize transformers T1A, T1B and T1C with associated condensers C1A, C1B and C1C to provide three-phase alternating-current energy at output terminals 119.

An important feature of the system of FIGURE 3 resides in the maintenance of efficiency over a wide range of variations in line voltage and load. For example, assume a static inverter operating from a 20 volt line (battery) into a 1000 watt load. If we increase the battery to 40 volts and leave the load the same, more current will be driven through the load and, in consequence, the voltage (IZ) will raise. This is usually objectionable and some form of voltage regulation is required. The overall efficiency of the unit drops off rapidly, more or less in proportion to the amount of regulation.

In accordance with the present invention the taps 121, 125 and 123 on the output transformers T1A, T1B and T1C, for example, may be changed in discrete steps to avoid this occurrence. That is, in the above example, with the 20 volt input, the efficiency was 90% and with the 40 volt input, the efficiency dropped to 60%. By suitably changing taps 121, 125 and 123 at the 40 volt point, the efficiency can be again brought to the 90% level. By using several tap positions, the efficiency will be, on the average, very high. The more taps used, the closer the average will be to the maximum possible under low line and heavy load.

One form of circuit for accomplishing this objective is shown in FIGURE 4, and will now be considered. An oscillator 202 (as previously described) is connected to a divider 204 which is in turn connected to a rectifier selector 206 having plural outputs to rectifiers V1' through V6' incorporated in circuitry as previously described. The selector comprises three controlled flip-flop circuits for example, only one of which is biased to an operative condition by a regulator circuit 207. One of the flip-flops is connected to lines 208 and 210 so that these lines receive opposite two-state signals when the flip-flop is operative. The other two flip-flops are connected respectively to lines 212 and 214, and 216 and 218. These pairs of lines are coupled to the rectifiers V1'-V6' which in FIGURE 4 are coupled to different symmetrical taps on the windings L1' and L2'.

The selector 206 is controlled by the regulator 207 which is connected to the inverter through a line 220. The regulator 207 may take various forms, one of which comprises a circuit sensitive to the voltage of the battery to selectively bias one of the flip-flops in the selector 206 operative depending upon the voltage of the battery B1. Of course, in other forms of the invention the regulator can variously operate one of the flip-flops in accordance with load, output voltage, or combinations thereof.

In the operation of the system, as the factor of concern (e.g. battery voltage) changes, a different one of the flip-flops in the selector 206 may be rendered operative to effectively operate the system through different taps on the windings L1' and L2'. That is, under a given set of conditions—i.e., line and load—controlled rectifiers V1' and V6' could operate while under another set of conditions, rectifiers V2' and V5' or rectifiers V3' and V4' would operate. The selection of the desired pair could be made in various other ways. Zener diodes, for example, could be used to cut in at certain line voltages and thereby cause the gates of the desired controlled rectifiers to accept the incoming signals. Of course, this principle could be incorporated in the various other systems of the invention.

An important feature of the present invention resides in the consideration that the output voltage is regulated in amplitude to a high degree with the sacrifice of very limited power. That is, the comparator circuit 120 consumes an exceedingly small amount of power and similarly a very small amount of power is consumed in the oscillatory circuit 14. As a result, the demands on the battery 82 approach the usable energy which appears at the output terminals 122.

Another important feature of the present invention resides in the use of coupling means between a pair of circuits which are connected to the input windings of the transformer, whereby the initiations of a current in one circuit effects the opening of a switch in the other circuit and in this manner efficient inverter switching is effected.

While there has been shown herein what is considered to be the preferred embodiment of the present invention, it will be apparent that various modifications and changes may be made with respect to the foregoing description without departing from the spirit of the invention or the scope of the following claims.

We claim:

1. An inverter system comprising: a source of D.C. current; a transformer having an output winding, a first input winding, and a second input winding; a variable impedance circuit; a first disabling transformer having a primary and a secondary winding; a second disabling transformer having a primary and a secondary winding; a first switching element comprising a first controlled rectifier; said D.C. source, said first input winding, said secondary winding of said first disabling transformer, said first switching element, said variable impedance circuit, and said primary winding of said second disabling transformer defining a first switched circuit; a second switching element comprising a second controlled rectifier; said D.C. source, said second input winding, said secondary winding of said secondary disabling transformer, said second switching element, said variable impedance circuit, and said primary winding of said first disabling transformer defining a second switched circuit; means for generating control signals; and means for causing said control signals to alternately actuate said first and said second switching elements whereby the actuated one of said switching elements actuates its associated switched circuit thereby disabling the unactuated switching element and producing an output signal.

2. An inverter system comprising: a source of D.C. current; a transformer having an output winding, a first input winding, and a second input winding; a variable impedance circuit; a first disabling transformer having a primary and a secondary winding; a second disabling transformer having a primary and a secondary winding; a first switching element comprising a controlled rectifier; said D.C. source, said first input winding, said secondary winding of said first disabling transformer, said first switching element, said variable impedance circuit, and said primary winding of said second disabling transformer defining a first switched circuit; a second switching element comprising a controlled rectifier; said D.C. source, said second input winding, said secondary winding of said secondary disabling transformer, said second switching element, said variable impedance circuit, and said primary winding of said first disabling transformer defining a second switched circuit; means for generating control signals; means for causing said control signals to alternately actuate said first and said second switching elements whereby the actuated one of said switching elements actuates its associated switched circuit thereby disabling the unactuated switching element and producing an output signal; a source of reference voltage; a comparator; means for causing said comparator to compare said output signal from said output winding with said reference voltage to produce an error signal; means for causing said error signal to control the impedance of said variable impedance circuit to thereby control the current flowing through said input windings for controlling said output signal.

3. An inverter system comprising: a source of D.C. current; a transformer having an output winding, a first input winding; and a second input winding; a variable impedance circuit; a first disabling transformer having a primary and a secondary winding; a second disabling transformer having a primary and a secondary winding; a first switching element comprising a controlled rectifier; said D.C. source, said first input winding, said secondary winding of said first disabling transformer, said first switching element, said variable impedance circuit, and said primary winding of said second disabling transformer defining a first switched circuit; a second switching element comprising a controlled rectifier; said D.C. source, said second input winding, said secondary winding of said second disabling transformer, said second switching element, said variable impedance circuit, and said primary winding of said first disabling circuit defining a second switched circuit; means for generating control signals; means for causing said control signals to alternately actuate said first and said second switching elements whereby the actuated one of said switching elements actuates its associated switched circuit, thereby disabling the unactuated switching element and producing an output signal; a magnetic amplifier; a source of reference voltage; a comparator; means for causing said comparator to compare said output signal with said reference voltage to produce an error signal; means for applying said error signal to said magnetic amplifier to control the state thereof; means for causing the state of said magnetic amplifier to control the impedance of said variable impedance to thereby control the current flowing through said input windings for controlling the output signal.

4. A D.C.-to-A.C. regulated inverter system comprising: a transformer having an output winding, a first input winding, and a second input winding; an oscillatory circuit comprising a parallel-connected inductance-capacitance network; a first disabling transformer having a primary and a secondary winding; a second disabling transformer having a primary and a secondary first switching means comprising a controlled rectifier; said D.C. source, said first input winding, said secondary winding of said first disabling transformer, said first switching means, said oscillatory circuit, and said primary winding of said second disabling transformer defining a first switched circuit; second switching means comprising a controlled rectifier;

said D.C. source, said second input winding, said secondary winding of said second disabling transformer, said second switching means, said oscillatory circuit, and said primary winding of said first disabling transformer defining a second switched circuit; means for generating control signals; a transformer coupled circuit for causing said control signals to alternately actuate said first and said second switching means whereby the actuated one of said switching means actuates its associated switched circuit whereby the secondary winding of the associated disabling transformer disables the unactuated switching means, thereby causing said output winding to produce an output signal; a magnetic amplifier; a source of reference voltage; a comparator; means for causing said comparator to compare said output signal with said reference voltage to produce an error signal; means for applying said error signal to said magnetic amplifier to control the state thereof; means for causing the state of said magnetic amplifier to control the impedance of said oscillatory circuit and thereby control the current flowing through said actuated switched circuit to control said output signal.

References Cited by the Examiner

UNITED STATES PATENTS

| | | | |
|---|---|---|---|
| 2,088,490 | 7/37 | Slepian | 321—36 X |
| 2,203,663 | 6/40 | Bennett | 321—36 X |
| 2,731,591 | 1/56 | Kiltie | 321—16 X |
| 2,735,061 | 2/56 | Johnson | 321—36 |
| 2,774,878 | 12/56 | Jensen | 321—8 X |
| 2,783,384 | 2/57 | Bright et al. | 321—8 X |
| 2,953,735 | 9/60 | Schmidt | 321—45 X |
| 2,959,725 | 11/60 | Younkin | 321—45 X |
| 2,987,666 | 6/61 | Manteuffel | 323—58 |

FOREIGN PATENTS 784,444   10/57   Great Britain.

OTHER REFERENCES

Electronics, pages 52 to 55, by Frenzel and Gutzwiller; "Solid-State Thyratron Switches Kilowatts"; March 28, 1958.

LLOYD McCOLLUM, *Primary Examiner.*

SAMUEL BERNSTEIN, MILTON O. HIRSHFIELD,
*Examiners.*